(12) United States Patent
Ohtsukasa

(10) Patent No.: US 8,438,846 B2
(45) Date of Patent: May 14, 2013

(54) HYDRAULIC DRIVE APPARATUS

(75) Inventor: Naritoshi Ohtsukasa, Hiratsuka (JP)

(73) Assignee: Komatsu Ltd., Tokyo (JP)

(*) Notice: Subject to any disclaimer, the term of this patent is extended or adjusted under 35 U.S.C. 154(b) by 919 days.

(21) Appl. No.: 12/449,114

(22) PCT Filed: Jan. 9, 2008

(86) PCT No.: PCT/JP2008/050132
§ 371 (c)(1),
(2), (4) Date: Jul. 23, 2009

(87) PCT Pub. No.: WO2008/090761
PCT Pub. Date: Jul. 31, 2008

(65) Prior Publication Data
US 2010/0089051 A1    Apr. 15, 2010

(30) Foreign Application Priority Data

Jan. 24, 2007 (JP) .................................. 2007-013874

(51) Int. Cl.
*F16H 59/14* (2006.01)
(52) U.S. Cl.
USPC ............................................. 60/431; 60/490
(58) Field of Classification Search .................... 60/431, 60/490; 701/50
See application file for complete search history.

(56) References Cited

U.S. PATENT DOCUMENTS

| 5,582,007 A | 12/1996 | Countant et al. |
| 5,775,453 A | 7/1998 | Williams et al. |
| 2004/0020703 A1 | 2/2004 | Ishimaru et al. |
| 2004/0211614 A1* | 10/2004 | Matsuyama .................. 180/305 |
| 2006/0243511 A1 | 11/2006 | Ho et al. |

FOREIGN PATENT DOCUMENTS

| DE | 103 50 117 A1 | 6/2004 |
| JP | 62-13543 | 3/1987 |
| JP | 62-274103 | 11/1987 |
| JP | 62274103 A * | 11/1987 |
| JP | 3-292465 | 12/1991 |
| JP | 03292465 A * | 12/1991 |
| JP | 7-215096 A | 8/1995 |
| JP | 8-303586 A | 11/1996 |
| JP | 2764259 B2 | 4/1998 |

(Continued)

OTHER PUBLICATIONS

International Search Report dated Apr. 22, 2008, issued in PCT/JP2008/050132.

(Continued)

*Primary Examiner* — Thomas E Lazo
(74) *Attorney, Agent, or Firm* — Edwards Wildman Palmer LLP

(57) ABSTRACT

The present invention provides a hydraulic drive apparatus which can flexibly be set. The hydraulic drive apparatus which drives a variable displacement hydraulic motor 20 by a pressure oil discharged from a variable displacement hydraulic pump 10 and outputs a driving force of the hydraulic motor 20 to outside. The hydraulic drive apparatus includes torque upper limit setting unit which sets an upper limit of an output torque with respect to the hydraulic motor 20, and control unit which sets a maximum capacity limit value of the hydraulic motor 20 in accordance with the upper limit of the output torque when the upper limit of the output torque is set by the torque upper limit setting unit, and which sets a maximum capacity limit value of the hydraulic pump 10 in accordance with the upper limit of the output torque.

6 Claims, 13 Drawing Sheets

| | FOREIGN PATENT DOCUMENTS | | |
|---|---|---|---|
| JP | 10-151965 A | 6/1998 |
| JP | 10-252703 | 9/1998 |
| JP | 10-306874 | 11/1998 |
| JP | 10306874 A * | 11/1998 |
| JP | 2001-324015 A | 11/2001 |
| JP | 2004-144254 | 5/2004 |

OTHER PUBLICATIONS

Supplementary European Search Report for European Patent Application No. 08703003.7 issued May 6, 2011.

* cited by examiner

HYDRAULIC DRIVE APPARATUS

TECHNICAL FIELD

The present invention relates to a hydraulic drive apparatus which drives a variable displacement hydraulic motor by pressure oil discharged from a variable displacement hydraulic pump and which outputs a driving force of the hydraulic motor to outside.

BACKGROUND ART

Some vehicles used as a construction machine such as a wheel loader and a bulldozer are provided with hydraulic drive apparatuses called HST (Hydro-Static Transmission) between driving wheels and engines which are driving sources. The hydraulic drive apparatus includes a variable displacement hydraulic pump driven by the engine, and a variable displacement hydraulic motor which is driven by pressure oil discharged from the hydraulic pump. A driving force of the hydraulic motor is transmitted to a driving wheel to run the vehicle.

According to a vehicle to which the hydraulic drive apparatus is applied, by appropriately adjusting a capacity of the hydraulic pump and a capacity of the hydraulic motor, a ratio of the rotation number of the hydraulic pump and the rotation number of the hydraulic motor can freely be changed. Therefore, the speed of the vehicle can be changed continuously only by operation of an acceleration pedal without carrying out complicated lever operation, and the operability can be enhanced remarkably.

A general hydraulic motor has such characteristics that output torque becomes small if the hydraulic motor is rotated at high speed but the output torque is increased when the hydraulic motor is rotated at low speed. This relation between the rotation number and the output torque of the hydraulic motor is preferable when used on a normal road surface, because when a vehicle to which the hydraulic motor is applied runs at low speed, high output torque is transmitted to the driving wheel and the acceleration performance at the time of start of the vehicle is excellent.

However, the construction machine such as the wheel loader is frequently used on a low friction road surface such as a soft road surface and a snow road surface. In such a condition, the high output torque at the time of start of the vehicle promotes slip, and there is a possibility that it becomes difficult to obtain stable running performance.

To solve the above problem, in some of conventional hydraulic drive apparatuses, the upper limit of the output torque is set by electronically controlling the maximum capacity of the hydraulic motor. More specifically, the conventional hydraulic drive apparatus is constituted such that the maximum tilting angle can be changed using an colinoaxis type variable displacement hydraulic motor. According to this hydraulic drive apparatus, if the maximum tilting angle of the hydraulic motor is set low, the upper limit of the output torque is set low, and even if the engine accelerator pedal is depressed most on the low friction road surface, it is possible to suppress the slip of the vehicle.

According to the above-described hydraulic drive apparatus, if the minimum tilting angle of the hydraulic motor is changed, it is possible to set the upper limit for the rotation number of the hydraulic motor, and the speed upper limit of the vehicle to which the hydraulic drive apparatus is applied can be limited. According to the vehicle to which the hydraulic drive apparatus is applied, the speed upper limit can be suppressed to a low value by setting the minimum tilting angle to a large value. As a result, there is effect that even when the engine accelerator pedal is depressed most, the vehicle moves at low speed, and it becomes easy to carry out operation in a narrow place (see Patent Document 1 for example).

Patent Document 1: Japanese Patent Application Laid-open No. 2004-144254

DISCLOSURE OF THE INVENTION

Problem to be Solved by the Invention

Since the maximum tilting angle and the minimum tilting angle of a hydraulic motor can not reversely be set, of course, the maximum tilting angle and the minimum tilting angle mutually limit the other setting in some cases. More specifically, when attempt is made to set the upper limit of the output torque small with respect to the hydraulic motor and to set the upper limit of the rotation number low, it is necessary to set the maximum tilting angle small and to set the minimum tilting angle high. For example, when the usage on a low friction road surface is taken into consideration and the upper limit of the output torque is set small with respect to the hydraulic motor, the upper limit of the rotation number can not be set sufficiently low in some cases. In such a condition, although it is possible to prevent slip irrespective of the operation amount of the accelerator pedal, there is a possibility that the vehicle moves at higher speed than a desired speed.

Incidentally, even under such a condition, it is possible to suppress the vehicle speed to a low level if an operator suppresses the operation amount of the accelerator pedal. However, adjusting the operation amount of the accelerator pedal naturally accompanies a complicated operation of the accelerator pedal. Further, if the operation amount of the accelerator pedal is reduced, the rotation number of the engine is also reduced. Since a hydraulic pump of a working machine which supplies a hydraulic working machine of the construction machine with pressure oil is generally driven by an engine, if the rotation number of the engine is reduced, the discharge amount of the pressure oil is also reduced. As a result, if slip of the vehicle is prevented and its speed is suppressed to a low level, it becomes difficult to secure high operation speed for the hydraulic working machine, and this largely affect the operation efficiency.

In view of the above circumstances, it is an object of the present invention to provide a hydraulic drive apparatus which can widely and flexibly be set in accordance with desire of an operator.

Means for Solving Problem

According to an aspect of the present invention, a hydraulic drive apparatus which drives a variable displacement hydraulic motor by a pressure oil discharged from a variable displacement hydraulic pump and outputs a driving force of the hydraulic motor to outside includes:

a torque upper limit setting unit which sets an upper limit of an output torque with respect to the hydraulic motor; and a control unit which sets a maximum capacity limit value of the hydraulic motor in accordance with the upper limit of the output torque when the upper limit of the output torque is set by the torque upper limit setting unit, and which sets a maximum capacity limit value of the hydraulic pump in accordance with the upper limit of the output torque.

Advantageously, the hydraulic drive apparatus, further includes: a motor capacity setting unit which sets and changes the capacity of the hydraulic motor by changing a tilting angle in accordance with a capacity command signal given from the control unit; and a pump capacity setting unit which sets and changes the capacity of the hydraulic pump by changing the tilting angle in accordance with the capacity command signal given from the control unit. The control unit gives, to the motor capacity setting unit and the pump capacity setting unit, a capacity command signal to make each capacity of the hydraulic motor and the hydraulic pump equal to or lower than the maximum capacity limit value set for each of the hydraulic motor and the hydraulic pump.

According to another aspect of the present invention, a hydraulic drive apparatus which drives a variable displacement hydraulic motor by a pressure oil discharged from a variable displacement hydraulic pump and outputs a driving force of the hydraulic motor to outside includes: a torque upper limit setting unit which sets an upper limit of an output torque with respect to the hydraulic motor; a rotation number upper limit setting unit which sets an upper limit of the rotation number with respect to the hydraulic motor; and a control unit which sets a maximum capacity limit value of the hydraulic motor in accordance with the upper limit of the output torque, sets a minimum capacity limit value of the hydraulic motor in accordance with the upper limit of the rotation number, and sets a maximum capacity limit value of the hydraulic pump in accordance with the upper limit of the output torque and the upper limit of the rotation number, when the upper limit of an output torque is set by the torque upper limit setting unit and when the upper limit of the rotation number is set by the rotation number upper limit setting unit.

Advantageously, the hydraulic drive apparatus further includes: a motor capacity setting unit which sets and changes the capacity of the hydraulic motor by changing a tilting angle in accordance with a capacity command signal given from the control unit; and a pump capacity setting unit which sets and changes the capacity of the hydraulic pump by changing the tilting angle in accordance with the capacity command signal given from the control unit. The control unit gives, to the motor capacity setting unit and the pump capacity setting unit, a capacity command signal to make a capacity of the hydraulic motor and the hydraulic pump equal to or lower than the maximum capacity limit value set for each of the hydraulic motor and the hydraulic pump.

Advantageously, the hydraulic drive apparatus further includes a pressure detection sensor which detects a pressure in an oil pressure supply tube through which a pressure oil flows between the hydraulic pump and the hydraulic motor. The control unit corrects the maximum capacity limit value of the hydraulic pump such that the rotation number of the hydraulic motor specified from a detection result of the pressure detection sensor becomes equal to or less than the upper limit.

Advantageously, the hydraulic drive apparatus further includes a rotation number detection sensor which detects the rotation number of the hydraulic motor. The control unit corrects the maximum capacity limit value of the hydraulic pump such that a detection result of the rotation number detection sensor becomes equal to or less than the upper limit.

Advantageously, the hydraulic drive apparatus further includes an upper limit setting unit which simultaneously sets, with a single operation, an upper limit of the output torque and an upper limit of the rotation number with respect to the hydraulic motor.

EFFECT OF THE INVENTION

According to the present invention, the hydraulic drive apparatus includes the control unit which sets the maximum capacity limit value of the hydraulic motor in accordance with the upper limit of the output torque required for the hydraulic motor, and which sets the maximum capacity limit value of the hydraulic pump in accordance with the upper limit of the output torque. Therefore, even when the upper limit of the rotation number of the hydraulic motor is limited by setting the maximum capacity limit value of the hydraulic motor, it is possible to set the upper limit of the rotation number required for the hydraulic motor by setting the maximum capacity limit value of the hydraulic pump, and it is possible to flexibly set the apparatus in accordance with the desire of the operator.

Figure 1:
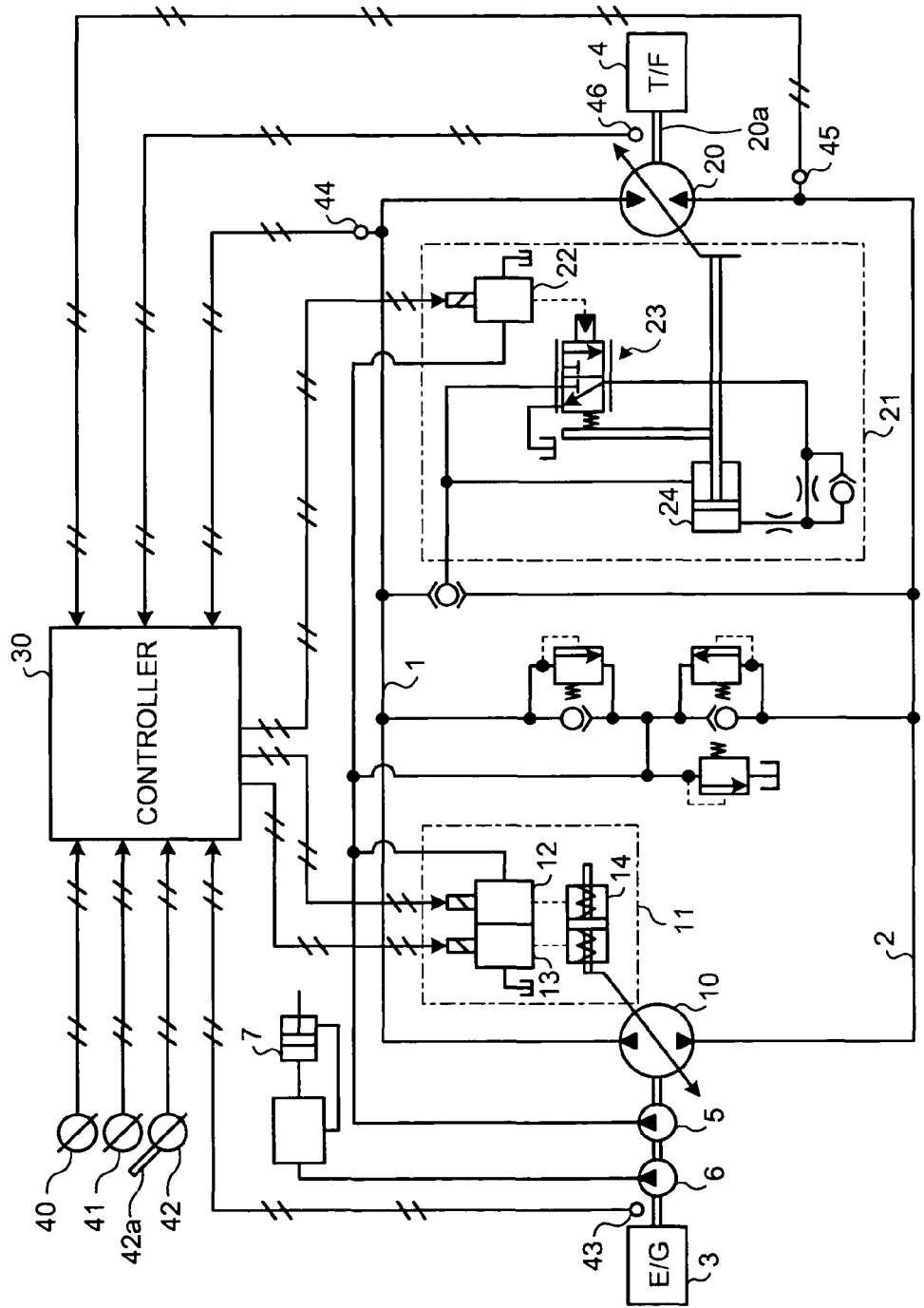
FIG. 1 is a circuit diagram showing a structure of a hydraulic drive apparatus according to an embodiment of the present invention.

EXPLANATION OF LETTERS OR NUMERALS 1, 2 oil pressure supply tube
3 engine
4 transfer
5 charge pump
6 working machine hydraulic pump
7 hydraulic working machine
10 HST pump
11 pump capacity setting unit
12 forward pump EPC valve
13 backward pump EPC valve
14 pump capacity control cylinder
20 HST motor
21 motor capacity setting unit
22 motor EPC valve
23 motor cylinder control valve 24 motor capacity control cylinder
30 controller
31 capacity limit setting unit
32 pump command pressure setting unit
33 motor capacity command value setting unit
34 memory
40 vehicle speed setting potentiometer
41 running mode change-over switch
42 direction input lever switch
43 engine rotation sensor
44, 45 pressure detection sensor
46 rotation number detection sensor
140 attachment mode switch

BEST MODE FOR CARRYING OUT THE INVENTION

A preferred embodiment of a hydraulic drive apparatus according to the present invention will be explained in detail with reference to the accompanying drawings. FIG. 1 shows the hydraulic drive apparatus of the embodiment of the invention. The hydraulic drive apparatus shown here as an example is so-called HST, and is provided in a vehicle used as construction machine such as a wheel loader and a bulldozer. The hydraulic drive apparatus includes a hydraulic pump 10 and a hydraulic motor 20 connected to each other through oil pressure supply tubes 1 and 2 which is a closed circuit.

The hydraulic pump ("HST pump 10", hereinafter) is driven by an engine 3 of a vehicle. In this embodiment, a variable displacement HST pump 10 capable of changing its capacity by changing a tilting angle of a swash plate is applied.

The hydraulic motor ("HST motor 20", hereinafter) is driven by pressure oil discharged from the HST pump 10. In this embodiment, a variable displacement HST motor 20 whose capacity can be changed by changing a tilting angle of clinoaxis is applied. An output shaft 20a of the HST motor 20 is connected to driving wheels of a vehicle (not shown) through a transfer 4, and the vehicle can run by rotating the driving wheels. A rotation direction of the HST motor 20 can be switched in accordance with a supply direction of pressure oil from the HST pump 10, and the vehicle can run forward or backward. For convenience, the following description will be made based on assumption that if pressure oil is supplied from the oil pressure supply tube 1 to the HST motor 20, the vehicle moves forward, and if the pressure oil is supplied from the oil pressure supply tube 2 to the HST motor 20, the vehicle moves backward.

The hydraulic drive apparatus includes a pump capacity setting unit 11, a motor capacity setting unit 21, a charge pump 5 and a working machine hydraulic pump 6.

The pump capacity setting unit 11 is attached to the HST pump 10, and includes a forward pump solenoid proportional control valve ("forward pump EPC valve 12", hereinafter), a backward pump solenoid proportional control valve ("backward pump EPC valve 13", hereinafter) and a pump capacity control cylinder 14. In the pump capacity setting unit 11, if a capacity command signal is given to the forward pump EPC valve 12 and the backward pump EPC valve 13 from a later-described controller (control unit) 30, the pump capacity control cylinder 14 is operated by pressure oil supplied from the forward pump EPC valve 12 or the backward pump EPC valve 13, the tilting angle of the HST pump 10 is changed, and the setting of the capacity of the HST pump 10 is changed in accordance with the capacity command signal.

The motor capacity setting unit 21 is attached to the HST motor 20, and includes a motor solenoid proportional control valve ("motor EPC valve 22", hereinafter), a motor cylinder control valve 23 and a motor capacity control cylinder 24. In the motor capacity setting unit 21, if a capacity command signal is given from the later-described controller 30 to the motor EPC valve 22, pilot pressure is supplied from the motor EPC valve 22 to the motor cylinder control valve 23, the motor capacity control cylinder 24 is operated, the tilting angle of the HST motor 20 is changed, and the setting of the capacity of the HST motor 20 is changed in accordance with the capacity command signal.

The charge pump 5 is driven by the engine 3 provided in the vehicle. The charge pump 5 has a function to supply pressure oil to the forward pump EPC valve 12 and the backward pump EPC valve 13 for operating the pump capacity control cylinder 14, and to supply pilot pressure to the motor EPC valve 22 for operating the motor cylinder control valve 23. Like the charge pump 5, the working machine hydraulic pump 6 is driven by the engine 3 provided in the vehicle, and has a function to supply pressure oil for driving the hydraulic working machine 7 of the construction machine.

The hydraulic drive apparatus includes a vehicle speed setting potentiometer (upper limit of the rotation number setting unit) 40, a running mode change-over switch (torque upper limit setting unit) 41, a direction input lever switch 42, an engine rotation sensor 43 and two pressure detection sensors 44 and 45.

The vehicle speed setting potentiometer 40 is for setting a speed upper limit (=upper limit of the rotation number of the HST motor 20) by an operator of the vehicle. In this embodiment, a dial type potentiometer for setting the speed upper limit is provided at a location where it can be operated from a driver's seat of the vehicle. The speed upper limit which is set by the vehicle speed setting potentiometer 40 is given to the later-described controller 30 as a setting signal. The means for setting the speed upper limit of the vehicle is not limited to one which sets continuous values like the potentiometer, and one which sets a stepwise value like a change-over switch may be used.

The running mode change-over switch 41 is used for an operator of a vehicle to select one of running modes. In the running modes, a using state of the vehicle is determined as a traction force upper limit (=output torque upper limit of the HST motor 20). In this embodiment, three running modes, i.e., "high traction mode", "mid traction mode" and "low traction mode" whose traction force upper limits of the vehicle are different from each other are prepared. The traction force upper limit of the vehicle of the high traction mode is greater than that of the mid traction mode, and the traction force upper limit of the mid traction mode is greater than that of the low traction mode. The running mode change-over switch 41 can select one of the running modes. The running mode change-over switch 41 is also provided at a location where it can be operated from the driver's seat. Information indicating the running mode selected by the running mode change-over switch 41 is given to the later-described controller 30 as the selected signal.

The direction input lever switch 42 is a selection switch for inputting a travelling direction of the vehicle. In this embodiment, it is possible to select three travelling directions, i.e., "forward", "neutral" and "backward" through the direction input lever switch 42 by operating the direction input lever 42a provided at a location where it can be selected from the driver's seat. Information indicating the travelling direction selected through the direction input lever switch 42 is given to the later-described controller 30 as selected information.

The engine rotation sensor 43 is for detecting the rotation number of the engine 3. The pressure detection sensors 44 and 45 are for detecting hydraulic pressure in the oil pressure supply tubes 1 and 2, respectively, between the HST pump 10 and the HST motor 20. Information indicating the rotation number of the engine 3 detected by the engine rotation sensor 43 and information indicating pressure in the oil pressure supply tubes 1 and 2 respectively detected by the pressure detection sensors 44 and 45 are input to the later-described controller 30 as detection signals.

Figure 2:
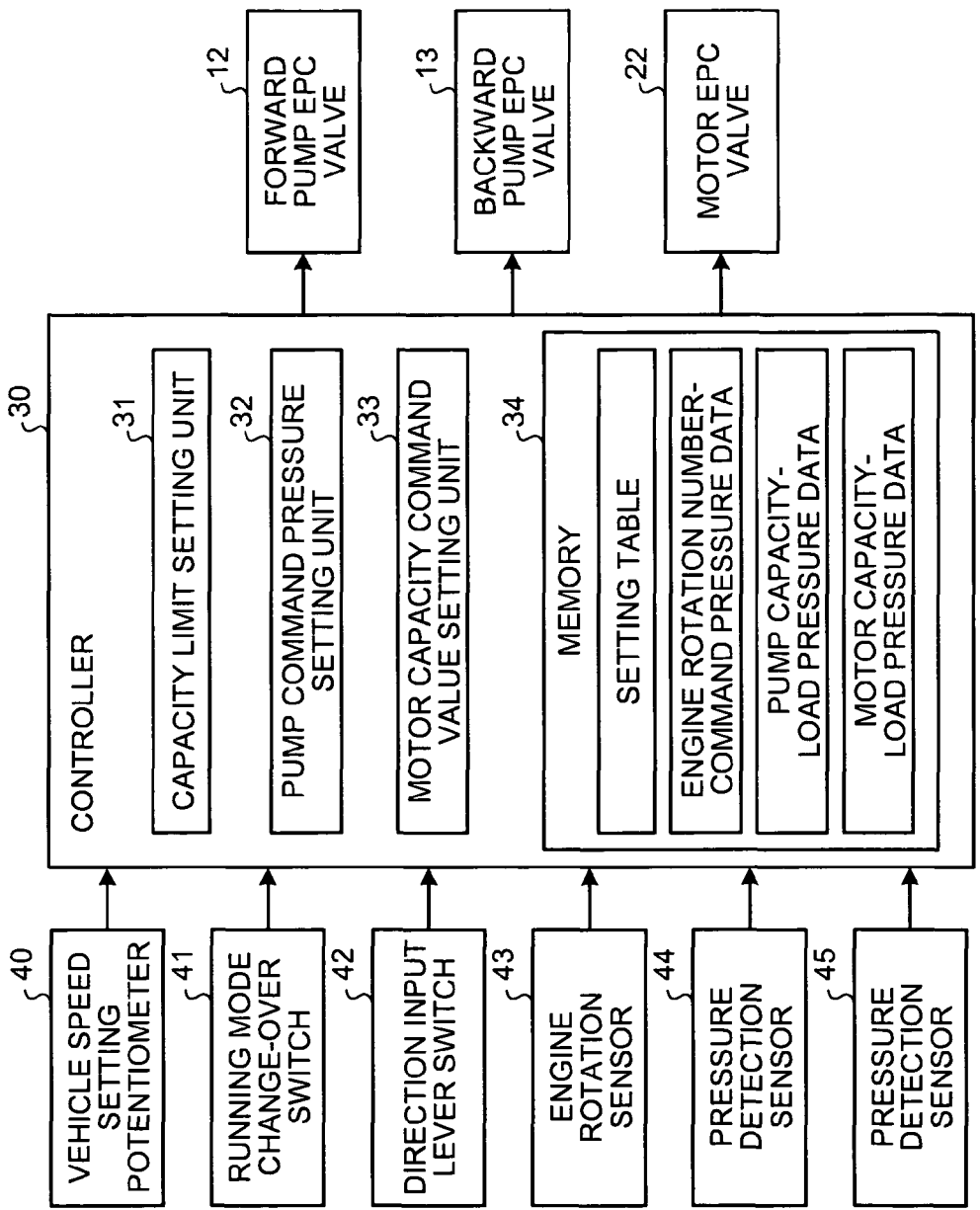
FIG. 2 is a block diagram of a control system of the hydraulic drive apparatus shown in FIG. 1.

The hydraulic drive apparatus includes the controller 30. The controller 30 is an electronic control apparatus which produces a capacity command signal to the forward pump EPC valve 12, the backward pump EPC valve 13 and the motor EPC valve 22 based on input signals from the vehicle speed setting potentiometer 40, the running mode change-over switch 41, the direction input lever switch 42, the engine rotation sensor 43 and the pressure detection sensors 44 and 45, and which gives the produced capacity command signal to the EPC valves 12, 13 and 22. As shown in FIG. 2, the controller 30 of this embodiment includes a capacity limit setting unit 31.

When the input signals are given to the capacity limit setting unit 31 from the vehicle speed setting potentiometer 40 and the running mode change-over switch 41, the capacity limit setting unit 31 sets a maximum capacity limit value and a minimum capacity limit value of the HST motor 20 based on the input signals and a setting table which is previously stored in a memory 34, and sets a maximum capacity limit value of the HST pump 10.

Figure 3:
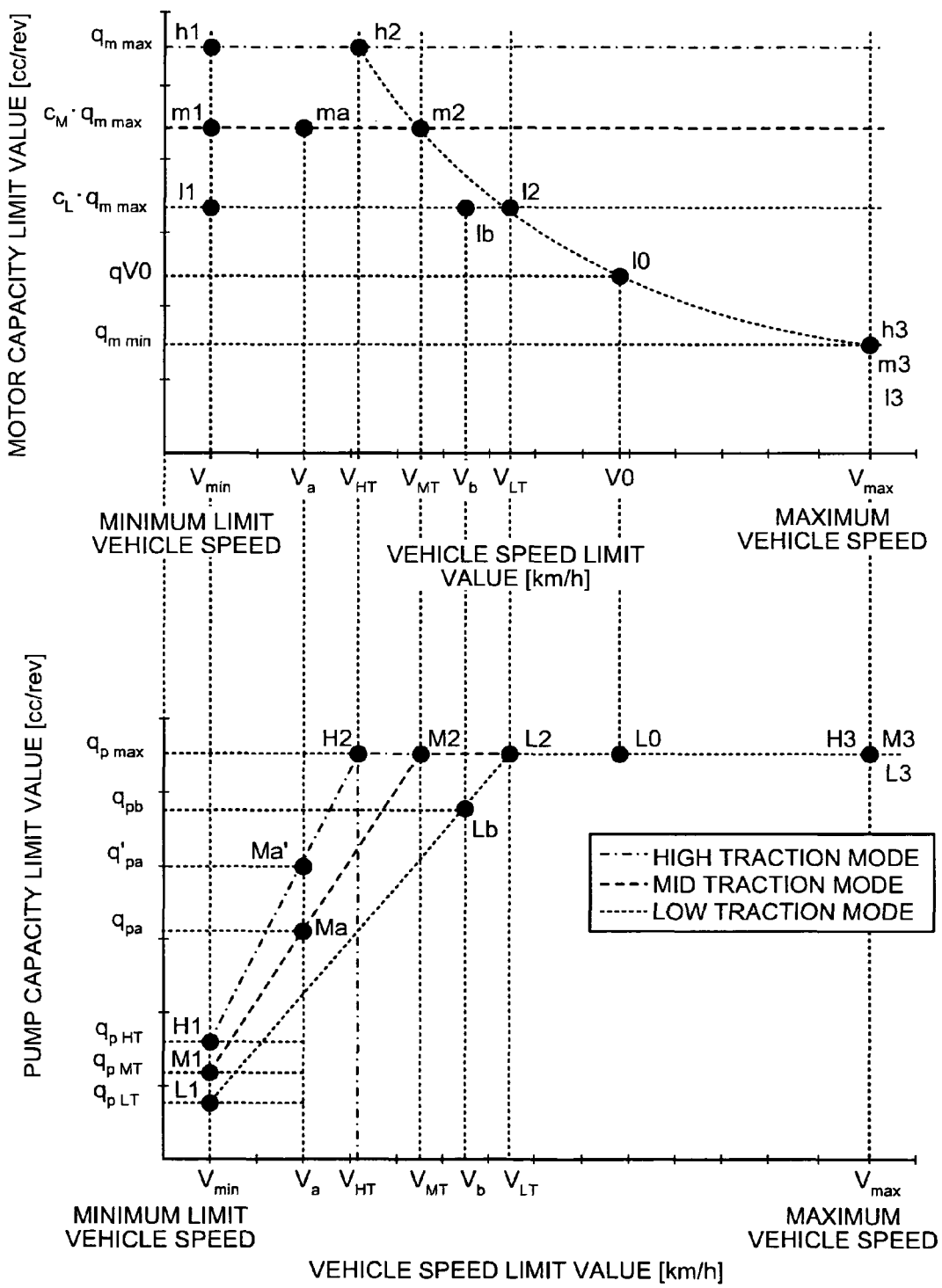
FIG. 3 is a graph showing an example of a setting table which is applied to the hydraulic drive apparatus shown in FIG. 1.

A relation between a capacity setting range and vehicle speed setting range to be applied is previously set in the setting table stored in the memory 34 by taking the characteristics of the HST motor 20 and the HST pump 10 applied to the hydraulic drive apparatus into consideration. In this embodiment, as shown in FIG. 3, a setting table in which a relation among a speed limit value of a vehicle, and a motor capacity limit value and a pump capacity limit value are expressed in a diagram is applied. There, a maximum vehicle speed which can be set is defined as Vmax, and a minimum vehicle speed which can be set is defined as Vmin.

Concerning the motor-side setting table shown in an upper portion in FIG. 3, a relation between the motor capacity limit value and the speed limit value of the vehicle which are determined by taking characteristics of the HST motor 20 to be applied into consideration is set as an individual setting diagram for each of the three running modes.

More specifically, a setting diagram indicated with "l1"→"l2"→"l3" is set for "low traction mode", a setting diagram indicated with "m1"→"m2"→"m3" is set for "mid traction mode", and a setting diagram indicated with "h1"→"h2"→"h3" is set for "high traction mode".

As is apparent from the drawing, in the setting diagram for each running mode, "l2"→"l3" of the "low traction mode", "m2"→"m3" of the "mid traction mode" and "h2"→"h3" of the "high traction mode", it is set such that as the speed limit value of the vehicle is increased, the motor capacity limit value is gradually reduced.

In "l1"→"l2" of the "low traction mode", "m1"→"m2" of the "mid traction mode" and "h1"→"h2" of the "high traction mode", it is set such that the motor capacity limit value becomes a constant value irrespective of the speed limit value of the vehicle. The motor capacity limit value set in "h1"→"h2" of the "high traction mode" is the maximum capacity value qm max which is physically possible to be set in the HST motor 20. The motor capacity limit value which is set in "l1"→"l2" of the "low traction mode" and "m1"→"m2" of the "mid traction mode" is an upper limit of the motor capacity which is set in the HST motor 20 for realizing the traction force upper limit of the vehicle required in each running mode. More specifically, the motor capacity limit value of the "mid traction mode" is set to cM·qm max and is constant, and the motor capacity limit value of the "low traction mode" is set to cL·qm max and is constant. However, cM·qm max>cL·qm max. Here, qm min is a minimum capacity value which is physically possible to be set in the HST motor 20. When the capacity of the HST motor 20 is set to the minimum capacity value qm min, the vehicle speed becomes the maximum.

Concerning the pump-side setting table shown in a lower portion in FIG. 3, a relation between the pump capacity limit value and the speed limit value of the vehicle determined by taking characteristics of the HST pump 10 to be applied into consideration is set as a setting diagram for each of the three running modes.

More specifically, a setting diagram indicated with "L1"→"L2"→"L3" is set for the "low traction mode", a setting diagram indicated with "M1"→"M2"→"M3" is set for the "mid traction mode" and a setting diagram indicated with "H1"→"H2"→"H3" is set for the "high traction mode".

As is apparent from the drawing, in "L1"→"L2" of the "low traction mode", "M1"→"M2" of the "mid traction mode" and "H1"→"H2" of the "high traction mode" of the setting diagram of each running mode, it is set such that the pump capacity limit value is gradually increased as the speed limit value of the vehicle is increased. As to a variation amount of the pump capacity limit value with respect to a variation amount of the speed limit value of the vehicle, the relation of the traction modes is as follows: "high traction mode">"mid traction mode">"low traction mode".

In "L2"→"L3" of the "low traction mode", "M2"→"M3" of the "mid traction mode" and "H2"→"H3" of the "high traction mode", it is set such that the pump capacity limit value becomes a constant value irrespective of the speed limit value of the vehicle. The pump capacity limit value set in each of "L2"→"L3" of the "low traction mode", "M2"→"M3" of the "mid traction mode" and "H2"→"H3" of the "high traction mode" is maximum capacity value qp max which is physically possible to be set in the HST pump 10, and is constant.

In each of the ranges "l2"→"l3" of the "low traction mode", "m2"→"m3" of the "mid traction mode" and "h2"→"h3" of the "high traction mode" in the motor capacity limit value shown in the upper portion in FIG. 3, the motor capacity limit value and the speed limit value of the vehicle correspond to each other in one-to-one relation. Therefore, if the minimum capacity limit value of the HST motor 20 is set in the above range, the vehicle speed upper limit is determined uniquely.

In the range of "l1"→"l2" of the "low traction mode", "m1"→"m2" of the "mid traction mode" and "h1"→"h2" of the "high traction mode", the motor capacity limit value becomes a constant value irrespective of the vehicle speed limit value due to a physical constraint of the HST motor 20 or a constraint for realizing the traction force required for the respective running modes. Therefore, in the above range, the upper limit can not be set for the vehicle speed by setting the minimum capacity limit value of the HST motor 20.

Similarly, in the ranges of "L1"→"L2" of the "low traction mode", "M1"→"M2" of the "mid traction mode" and "H1"→"H2" of the "high traction mode" in the pump capacity limit value shown in the lower portion in FIG. 3, the pump capacity limit value and the speed limit value of the vehicle correspond to each other in one-to-one relation. Therefore, if the maximum capacity limit value of the HST pump 10 is set in the above range, the vehicle speed upper limit is determined uniquely.

On the other hand, in the ranges of "L2"→"L3" of the "low traction mode", "M2"→"M3" of the "mid traction mode" and "H2"→"H3" of the "high traction mode", the pump capacity limit value becomes a constant value irrespective of the speed limit value of the vehicle due to a physical constraint of the HST pump 10. Thus, in the above range, the upper limit can not be set for the vehicle speed by setting the maximum capacity limit value of the HST pump 10.

That is, there exists a range where the vehicle speed upper limit can not be set only from the setting of the motor capacity limit value, and there exists a range where the vehicle speed upper limit can not be set only from the setting of the pump capacity limit value. Hence, in this embodiment, the above-described setting table is constituted such that the speed upper limit of the vehicle which can be set by the motor capacity limit value in the respective running modes and the speed upper limit of the vehicle which can be set by the pump capacity limit value are in a complementary relation.

More specifically, the vehicle speed upper limits are set such that a minimum value VLT of the vehicle speed upper limit which can be determined uniquely by the setting of the motor capacity limit value in the "low traction mode" of the motor-side setting table and a maximum value VLT of the vehicle speed upper limit which can be determined uniquely by the setting of the pump capacity limit value in the "low traction mode" of the pump-side setting table match with each other. Similarly, it is set such that a minimum value VMT of the vehicle speed upper limit which can be determined uniquely by the setting of the motor capacity limit value in the "mid traction mode" of the motor-side setting table and a maximum value VMT of the vehicle speed upper limit which can be determined uniquely by the setting of the pump capacity limit value in the "mid traction mode" of the pump-side setting table match with each other. Further, it is set such that a minimum value VHT of the vehicle speed upper limit which can be determined uniquely by the setting of the motor capacity limit value in the "high traction mode" of the motor-side setting table and a vehicle speed upper limit VHT which can be determined uniquely by the setting of the pump capacity limit value in the "high traction mode" of the pump-side setting table match with each other.

According to the setting table, the speed upper limit of the vehicle which can not be set only from the setting of the motor capacity limit value can be set by setting the pump capacity limit value. The vehicle speed upper limit which can not be set only from the setting of the pump capacity limit value can also be set by setting the motor capacity limit value.

The controller 30 of the embodiment includes a pump command pressure setting unit 32 and a motor capacity command value setting unit 33 as shown in FIG. 2.

When input signals are sent to the pump command pressure setting unit 32 from the engine rotation sensor 43, the direction input lever switch 42 and the pressure detection sensors 44 and 45, the pump command pressure setting unit 32 sets the capacity of the HST pump 10 based on these input signals, rotation number of the engine—command pressure data previously stored in the memory 34, pump capacity—load pressure data and the maximum capacity limit value of the HST pump 10 which is set by the capacity limit setting unit 31. The pump command pressure setting unit 32 sets a pump capacity command value corresponding to the capacity of the set HST pump 10, and outputs the pump capacity command value to the forward pump EPC valve 12 and the backward pump EPC valve 13 as a capacity command signal.

Here, a load pressure is a pressure in one of the oil pressure supply tubes 1 and 2 extending from the HST pump 10 to the HST motor 20 that is in a forward direction with respect to the rotation direction of the HST motor 20. For example, when the HST motor 20 rotates in the forward direction, a result of detection of the pressure detection sensor 44 provided in the oil pressure supply tube 1 is a load pressure, and when the HST motor 20 rotates in the backward direction, a result of detection of the pressure detection sensor 45 provided in the oil pressure supply tube 2 is a load pressure.

Figure 4:
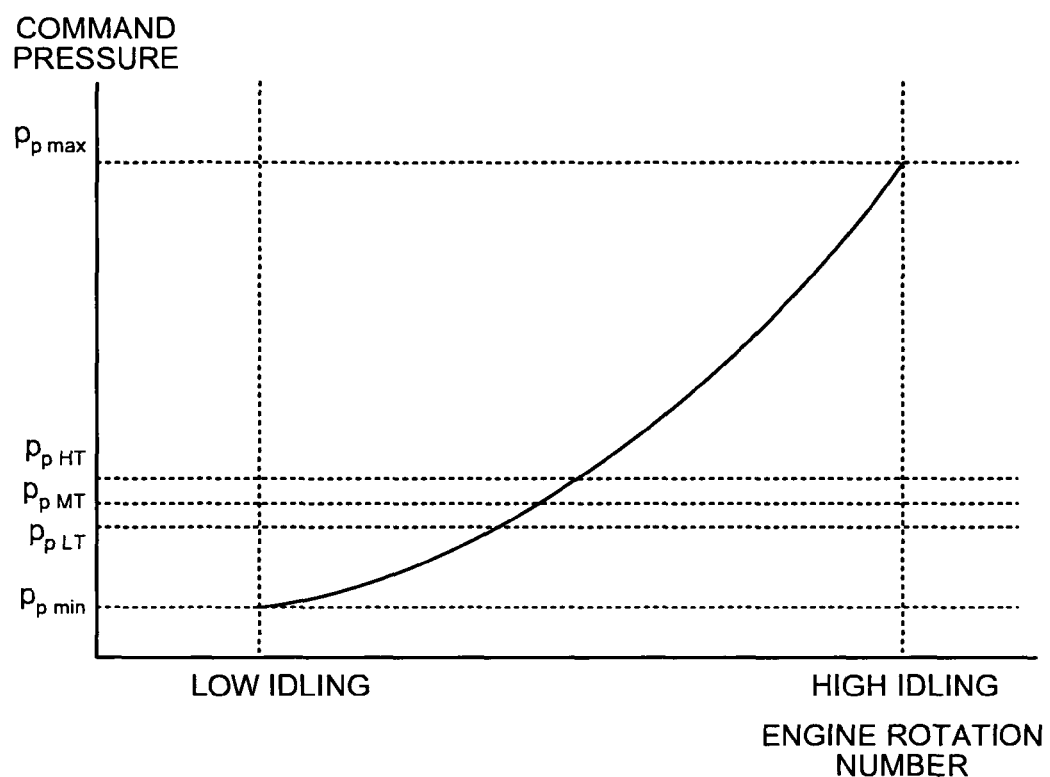
FIG. 4 is a graph showing an example of rotation number of the engine—command pressure data stored in a memory of a controller shown in FIG. 2.
Figure 5:
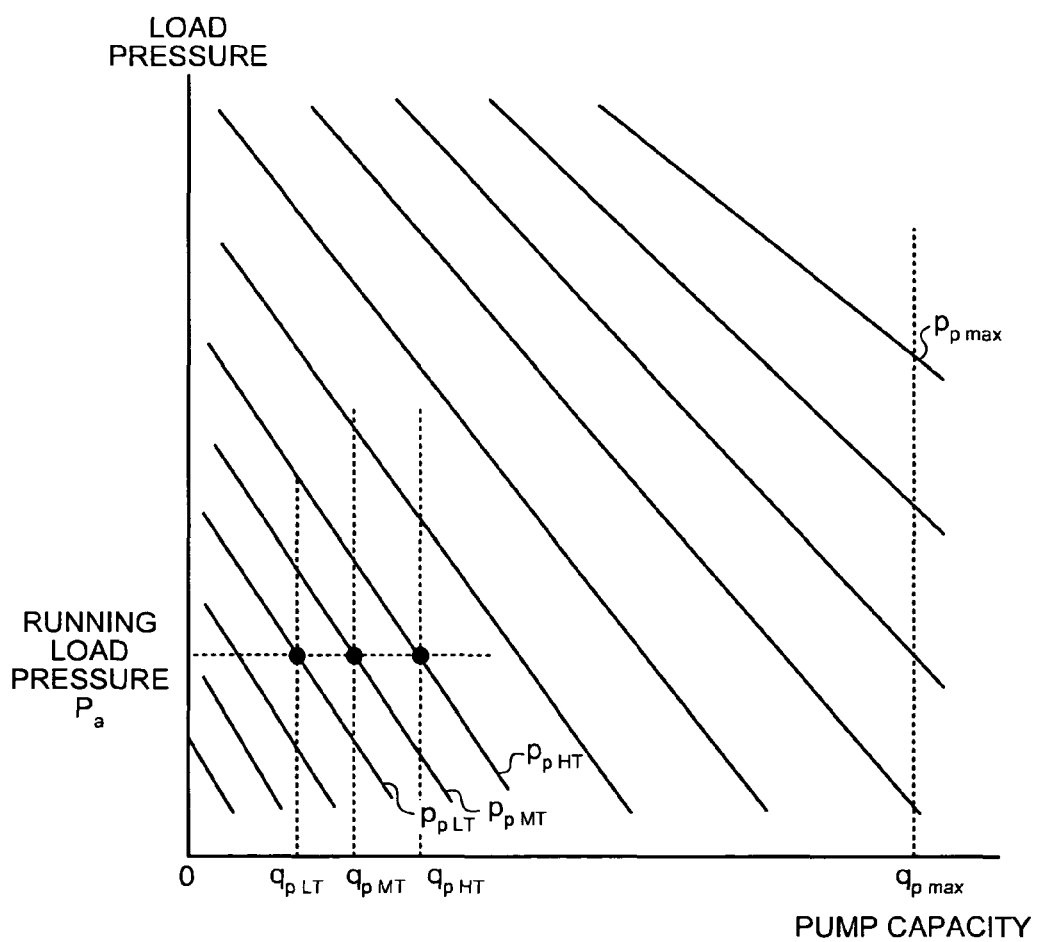
FIG. 5 is a graph showing an example of pump capacity—load pressure data stored in the memory of the controller shown in FIG. 2.

FIG. 4 shows an example of rotation number of the engine—command pressure data stored in the memory 34. Here, pp max represents a command pressure at a high idling, and pp min represents a command pressure at a low idling. If the rotation number of the engine is increased, the command pressure is increased. FIG. 5 shows an example of a variable displacement type hydraulic pump command pressure—pump capacity—load pressure characteristics in which the capacity is determined by the command pressure and a reaction force utilizing hydraulic tilting moment force by a load pressure. That is, when the rotation number of the engine is input from the engine rotation sensor 43, the pump command pressure setting unit 32 determines the command pressure based on the rotation number of the engine—command pressure data, and outputs command signal current for outputting a command pressure from the EPC valves 12 and 13 corresponding to the travelling direction selected by the direction input lever switch 42. With this, the HST pump 10 has a command pressure suitable for the current load pressure by the command pressure which is output from the EPC valves 12 and 13 and by the characteristics shown in FIG. 5.

The pump command pressure setting unit 32 sets a command pressure upper limit for realizing pump capacity limit using characteristics shown in FIG. 5 which are previously stored in the memory 34. For example, if it is desired to limit the pump capacity to qpHT or lower in the "high traction mode" when the load pressure at the time of running at the minimum limit vehicle speed is Pa, this desire is realized by controlling the command pressure to ppHT or lower. Similarly, when it is desired to limit the pump capacity to qpMT or less in the "mid traction mode", this desire is realized by controlling the command pressure to ppMT or less. Further, when it is desired to limit the pump capacity to qpLT or less in the "low traction mode", this desire is realized by controlling the command pressure to ppLT or less.

When a capacity command type variable displacement hydraulic pump is used, the pump command pressure setting unit 32 sets the pump capacity using characteristics shown in FIG. 5 stored in the memory 34 from the load pressure value and command pressure obtained from the pressure detection sensors 44 and 45, and outputs the pump capacity command value corresponding to the set pump capacity to the EPC valves 12 and 13 corresponding to the travelling direction selected by the direction input lever switch 42 as a capacity command signal.

When input signals are given to the motor capacity command value setting unit 33 from the engine rotation sensor 43 and the pressure detection sensors 44 and 45, the motor capacity command value setting unit 33 sets capacity of the HST motor 20 based on these input signals, the rotation number of the engine—command pressure data which is previously stored in the memory 34, the motor capacity—load pressure data, the maximum capacity limit value and minimum capacity limit value of the HST motor 20 set by the capacity limit setting unit 31. The motor capacity command value setting unit 33 sets the motor capacity command value corresponding to the capacity of the set HST motor 20, and outputs the motor capacity command value to the motor EPC valve 22 as the capacity command signal.

Figure 6:
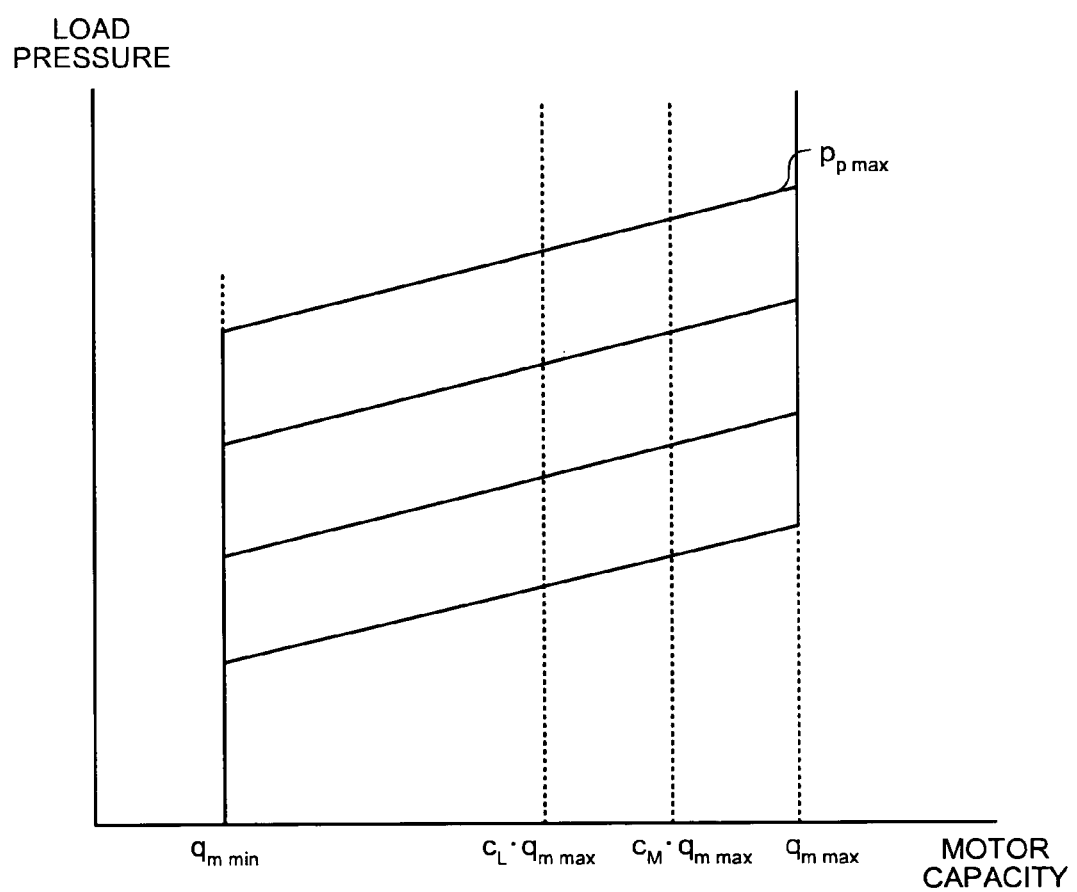
FIG. 6 is a graph showing an example of motor capacity—load pressure data stored in the memory of the controller shown in FIG. 2.

FIG. 6 shows an example of motor capacity—load pressure data stored in the memory 34, and a relation between the motor capacity and the load pressure is set for each command pressure. The same rotation number of the engine—command pressure data as shown in FIG. 4 is applied. When the rotation number of the engine is input from the engine rotation sensor 43, the motor capacity command value setting unit 33 specifies command pressure based on the rotation number of the engine—command pressure data, sets capacity of the HST motor 20 based on the motor capacity—load pressure data from the specified command pressure and a load pressure value input from the pressure detection sensors 44 and 45, and outputs the motor capacity command value corresponding to the set motor capacity to the motor EPC valve 22 as the capacity command signal.

Figure 7:
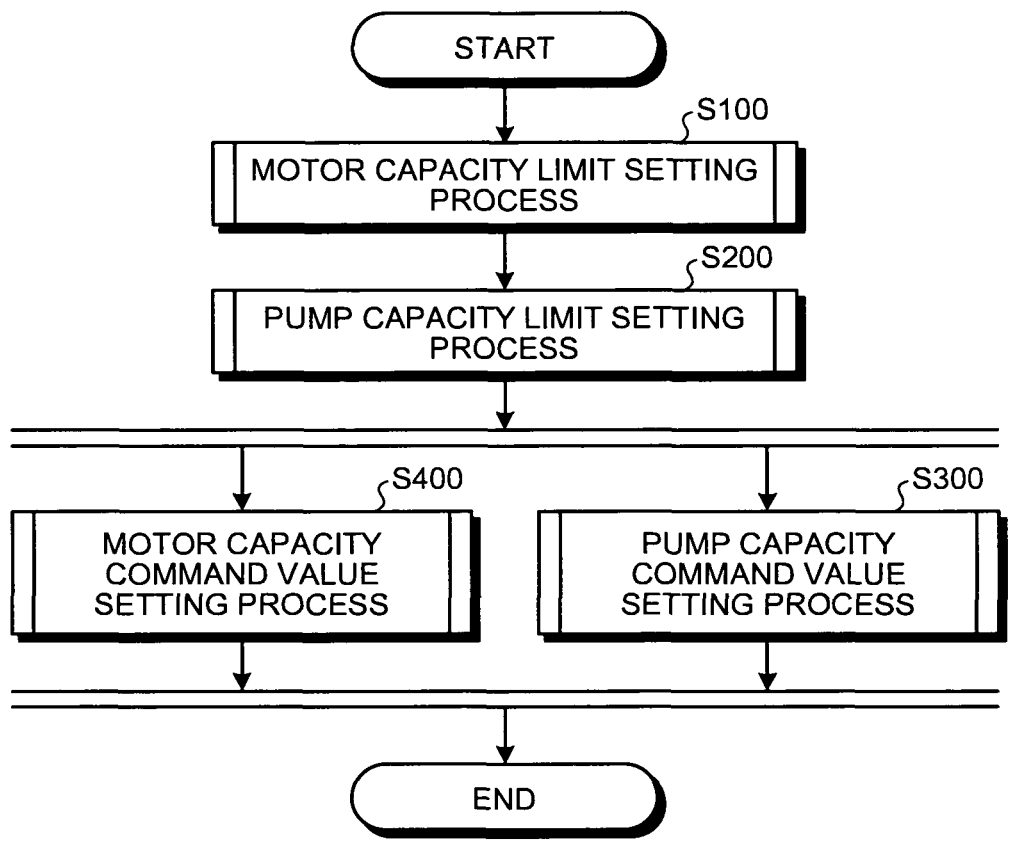
FIG. 7 is a flowchart showing an example of main process executed in the controller of the hydraulic drive apparatus shown in FIG. 1.

FIG. 7 is a flowchart showing an example of main process executed in the controller 30. When the hydraulic drive apparatus is in its operative state, the controller 30 executes motor capacity limit setting process (step S100) and pump capacity limit setting process (step S200) through the capacity limit setting unit 31 and then, executes the pump capacity command value setting process through the pump command pressure setting unit 32, and executes motor capacity command value setting process through the motor capacity command value setting unit 33 (step S300, step S400). The main process shown in FIG. 7 is repeatedly executed every preset predetermined cycle time.

Figure 8:
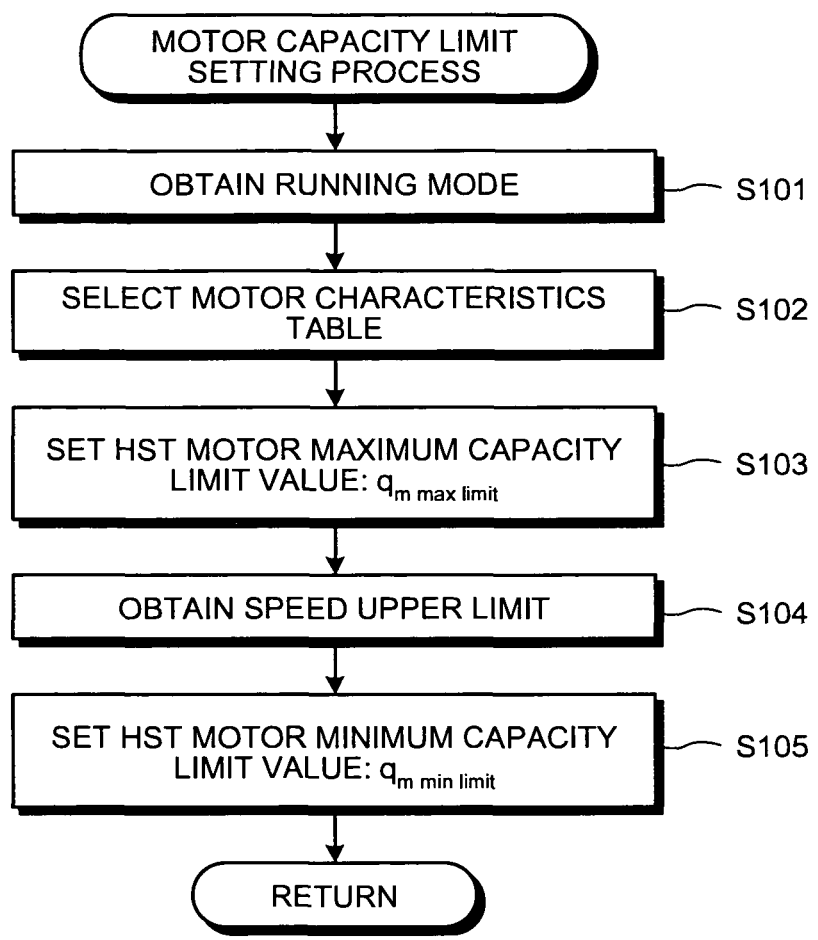
FIG. 8 is a flowchart showing contents of motor capacity limit setting process shown in FIG. 7.

In the motor capacity limit setting process in step S100, the controller 30 obtains a running mode which is set through the running mode change-over switch 41 (step S101) as shown in FIG. 8. Then, the controller 30 selects one of motor-side setting tables in the memory 34 corresponding to the obtained running mode (step S102), and sets a maximum capacity limit value qm max limit of the HST motor 20 from the selected motor-side setting table (step S103).

More specifically, if the running mode is obtained through the running mode change-over switch 41, the controller 30 selects a setting diagram corresponding to the running mode in the motor-side setting table of FIG. 3 stored in the memory 34, and sets the maximum value of the motor capacity limit value which can be selected in the setting diagram as a maximum capacity limit value qm max limit of the HST motor 20. For example, when "low traction mode" is selected by the running mode change-over switch 41, the controller 30 selects a setting diagram shown with "l1"→"l2"→"l3", and sets cL·qm max which is the maximum value of the motor capacity limit value which can be selected in this setting diagram as a maximum capacity limit value qm max limit of the HST motor 20. When "mid traction mode" is selected by the running mode change-over switch 41, the controller 30 selects a setting diagram shown with "m1"→"m2"→"m3", and sets cM·qm max which is the maximum value of the motor capacity limit value which can be selected in this setting diagram as a maximum capacity limit value qm max limit of the HST motor 20. Similarly, when "high traction mode" is selected by the running mode change-over switch 41, the controller 30 selects a setting diagram shown with "h1"→"h2"→"h3", and sets the maximum value of the motor capacity limit value qm max which can be selected in this setting diagram as a maximum capacity limit value qm max limit of the HST motor 20.

Next, the controller 30 obtains the vehicle speed upper limit through the vehicle speed setting potentiometer 40 (step S104), and sets minimum capacity limit value qm min limit of the HST motor 20 corresponding to the obtained speed upper limit from the motor-side setting table selected in step S102 (step S105).

When the vehicle speed upper limit which is set by the vehicle speed setting potentiometer 40 exceeds a speed upper limit which is defined by the maximum capacity limit value qm max limit of the HST motor 20 in the respective running modes, the controller 30 sets the motor capacity limit value corresponding to the speed upper limit as a minimum capacity limit value qm min limit of the HST motor 20 as it is.

For example, when the vehicle speed upper limit which is set by the vehicle speed setting potentiometer 40 is V0 (Vmax>V0>VLT), qV0 corresponding to a point 10 on the setting diagram is uniquely set as minimum capacity limit value qm min limit of the HST motor 20 irrespective of selected the running mode.

On the other hand, when the vehicle speed upper limit which is set by the vehicle speed setting potentiometer 40 is equal to or lower than the speed upper limit which is defined by the maximum capacity limit value qm max limit of the HST motor 20 in each running mode, the controller 30 sets the maximum capacity limit value of each running mode as the minimum capacity limit value qm min limit of the HST motor 20. For example, if the vehicle speed upper limit which is set by the vehicle speed setting potentiometer 40 is Vb (≦VLT) when the "low traction mode" is selected, since a point lb on the corresponding setting diagram is between "l1"→"l2", the minimum capacity limit value of the HST motor 20 is set to qm min limit=cL·qm max. Similarly, if the vehicle speed upper limit which is set by the vehicle speed setting potentiometer 40 is Va (≦VMT) when the "mid traction mode" is selected, since a point ma on the corresponding setting diagram is between "m1"→"m2", the minimum capacity limit value of the HST motor 20 is set to qm min limit=cM·qm max.

Figure 9:
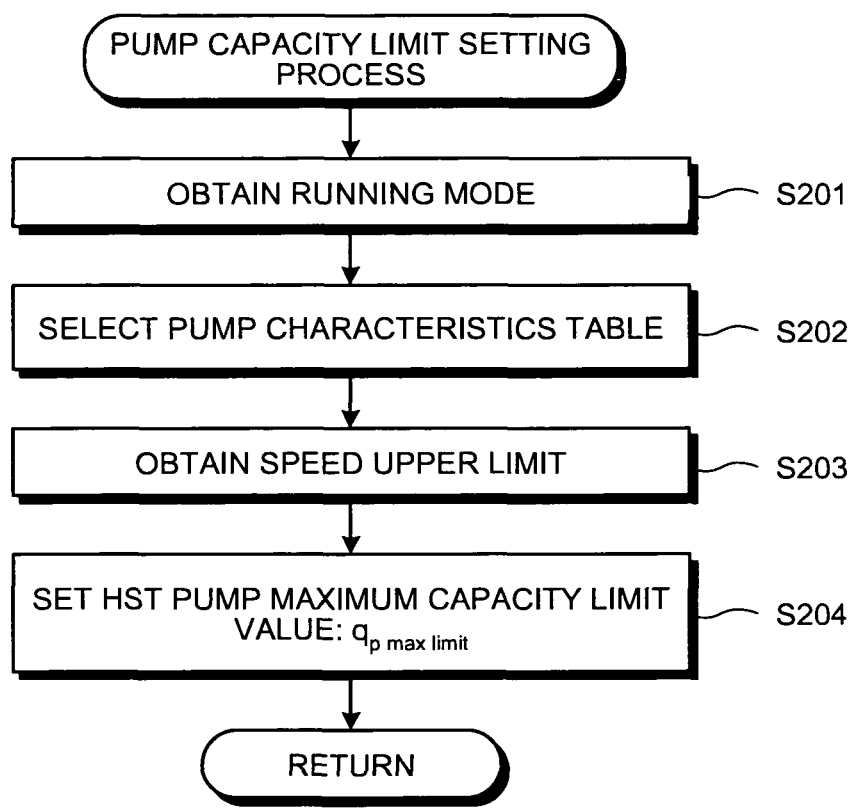
FIG. 9 is a flowchart showing contents of pump capacity limit setting process shown in FIG. 7.

On the other hand, the controller 30 obtains a running mode which is set through the running mode change-over switch 41 as shown in FIG. 9 in the pump capacity limit setting process in step S200 (step S201), and selects one of pump-side setting tables in the memory 34 corresponding to this obtained running mode (step S202). Further, a vehicle speed upper limit is obtained through the vehicle speed setting potentiometer 40 (step S203), and a maximum capacity limit value qp max limit of the HST pump 10 corresponding to the obtained speed upper limit is set from the pump-side setting table selected in step S202 (step S204).

More specifically, if a running mode is obtained through the running mode change-over switch 41, the controller 30 selects a setting diagram corresponding to the running mode in the pump-side setting table stored in the memory 34. Further, if the controller 30 obtains a vehicle speed upper limit through the vehicle speed setting potentiometer 40, the controller 30 sets the pump capacity limit value corresponding to the speed upper limit in the setting diagram as a maximum capacity limit value qp max limit of the HST pump 10.

For example, when the vehicle speed upper limit set by the vehicle speed setting potentiometer 40 is V0 (Vmax>V0>VLT), a point L0 on the setting diagram becomes a maximum capacity value qp max of the HST pump 10 irrespective of the selected running mode, and this is set as a maximum capacity limit value qp max limit of the HST pump 10.

Here, when the maximum capacity limit value qp max limit of the HST pump 10 is set in maximum capacity value qp max, the vehicle speed upper limit can not be set only by the HST pump 10. However, when the vehicle speed upper limit which is set by the vehicle speed setting potentiometer 40 is V0 (Vmax>V0>VLT), a minimum capacity limit value qm min limit of the HST motor 20 corresponding to the vehicle speed upper limit V0 has been uniquely set in the previous motor capacity limit setting process, and it is possible to set the upper limit V0 in the vehicle speed by setting the minimum capacity limit value qm min limit of the HST motor 20.

When the vehicle speed upper limit which is set by the vehicle speed setting potentiometer 40 is equal to or lower than the speed limit value which is defined by the maximum capacity limit value qm max limit of the HST motor 20 in the respective running modes, the controller 30 realizes the vehicle speed limit by adding a limit to the capacity of the HST pump 10.

That is, if the vehicle speed upper limit which is set by the vehicle speed setting potentiometer 40 is Vb ($\leq$VLT) when the "low traction mode" is selected, the controller 30 selects a setting diagram indicated with "L1"→"L2", and sets a pump capacity limit value qpb corresponding to a point Lb of the speed upper limit Vb in the setting diagram as a maximum capacity limit value qp max limit of the HST pump 10.

Similarly, if the vehicle speed upper limit which is set by the vehicle speed setting potentiometer 40 is Va ($\leq$VMT) when the "mid traction mode" is selected, the controller 30 selects a setting diagram indicated with "M1"→"M2", and the controller 30 sets a pump capacity limit value qpa corresponding to a point Ma of the speed upper limit Va in the setting diagram as a maximum capacity limit value qp max limit of the HST pump 10. Further, if the vehicle speed upper limit which is set by the vehicle speed setting potentiometer 40 is Va ($\leq$VHT) when the "high traction mode" is selected, the controller 30 selects a setting diagram indicated with "H1"→"H2", and sets a pump capacity limit value qpa' corresponding to a point Ma' of the speed upper limit Va in the setting diagram as a maximum capacity limit value qp max limit of the HST pump 10.

That is, when the vehicle speed upper limit can not be set by the minimum capacity limit value qm min limit of the HST motor 20 in the motor capacity limit setting process, the controller 30 sets the upper limit of speed for the vehicle by setting the maximum capacity limit value qp max limit of the HST pump 10 in the pump capacity limit setting process. Therefore, if the motor capacity limit setting process and the pump capacity limit setting process are carried out by the controller 30, it is possible to set the upper limit of the output torque with respect to the HST motor 20 and the vehicle speed upper limit to be applied to desired values. As a result, the running mode which can be set by the running mode change-over switch 41 and the vehicle speed upper limit which can be set by the vehicle speed setting potentiometer 40 are not limited, and both the vehicle traction force upper limit and vehicle speed upper limit can be flexibly set, for example, to extremely small values.

Thereafter, the motor capacity limit setting process (step S100) and the pump capacity limit setting process (step S200) are repeatedly executed for every cycle time, the maximum capacity limit value qm max limit and the minimum capacity limit value qm min limit of the HST motor 20 are set in correspondence with the vehicle speed upper limit which is set through the vehicle speed setting potentiometer 40 and a running mode which is set through the running mode change-over switch 41, and the maximum capacity limit value qp max limit of the HST pump 10 is set.

Figure 10:
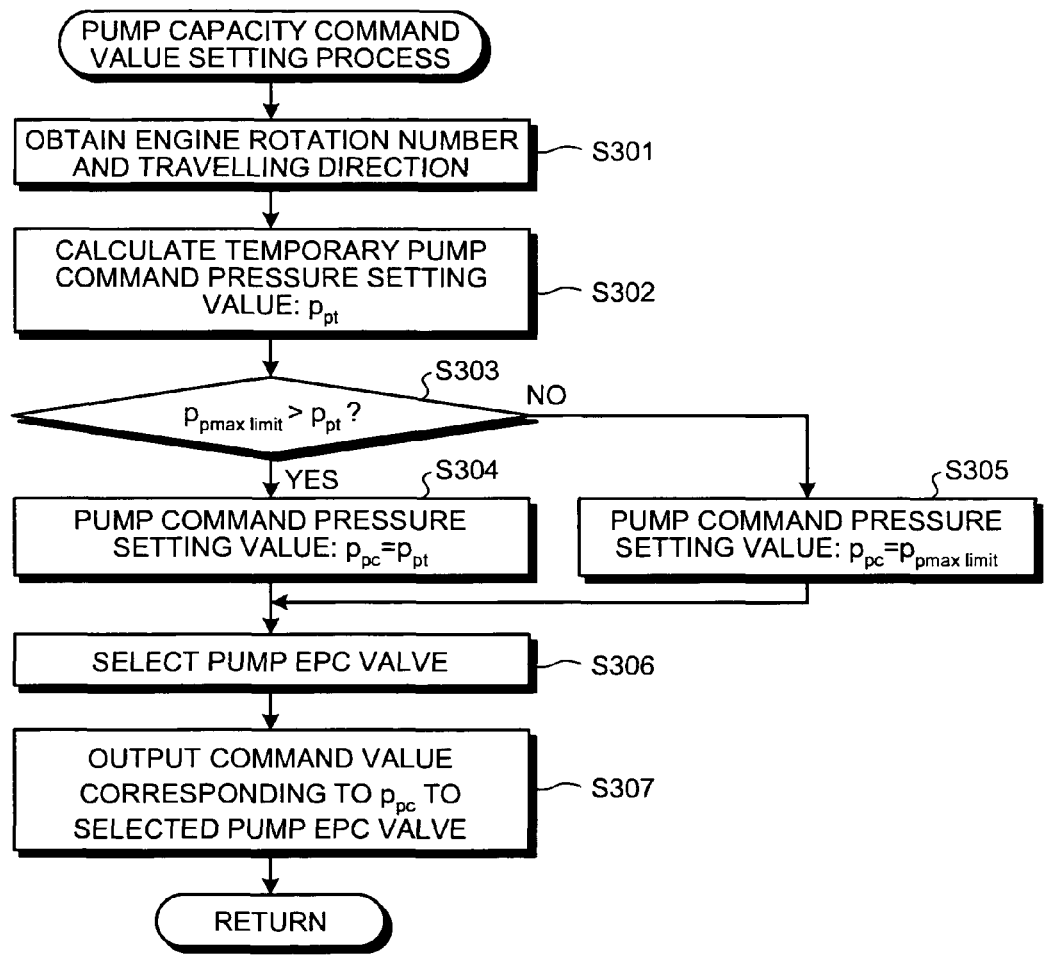
FIG. 10 is a flowchart showing contents of pump capacity command value setting process shown in FIG. 7.

Having set the maximum capacity limit value qm max limit and the minimum capacity limit value qm min limit of the HST motor 20, and set the maximum capacity limit value qp max limit of the HST pump 10, the controller 30 obtains the rotation number of the engine 3 through the engine rotation sensor 43 as shown in FIG. 10 in the pump capacity command value setting process in step S300, and obtains a travelling direction of the vehicle through the direction input lever switch 42 (step S301). Next, the controller 30 calculates a command pressure of the HST pump 10 as a temporary pump command pressure setting value ppt based on the obtained information of the rotation number of the engine 3 and the rotation number of the engine—command pressure data of FIG. 4 stored in the memory 34 (step S302).

Next, the controller 30 compares this temporary pump command pressure setting value ppt and the command pressure upper limit pp max limit realizing the maximum capacity limit value qp max limit of the HST pump 10 which is set by the capacity limit setting unit 31 with each other (step S303), and sets smaller one to a pump command pressure setting value ppc (step S304 and step S305). One of the pump EPC valves 12 and 13 which is to be controlled in accordance with the travelling direction of the vehicle is selected (step S306), current corresponding to an output for the pump command pressure setting value with respect to the selected pump EPC valve is output (step S307), and then, the process is returned. The capacity of the HST pump 10 is controlled by the pump capacity setting unit 11 to correspond to the rotation number of the engine 3.

Figure 11:
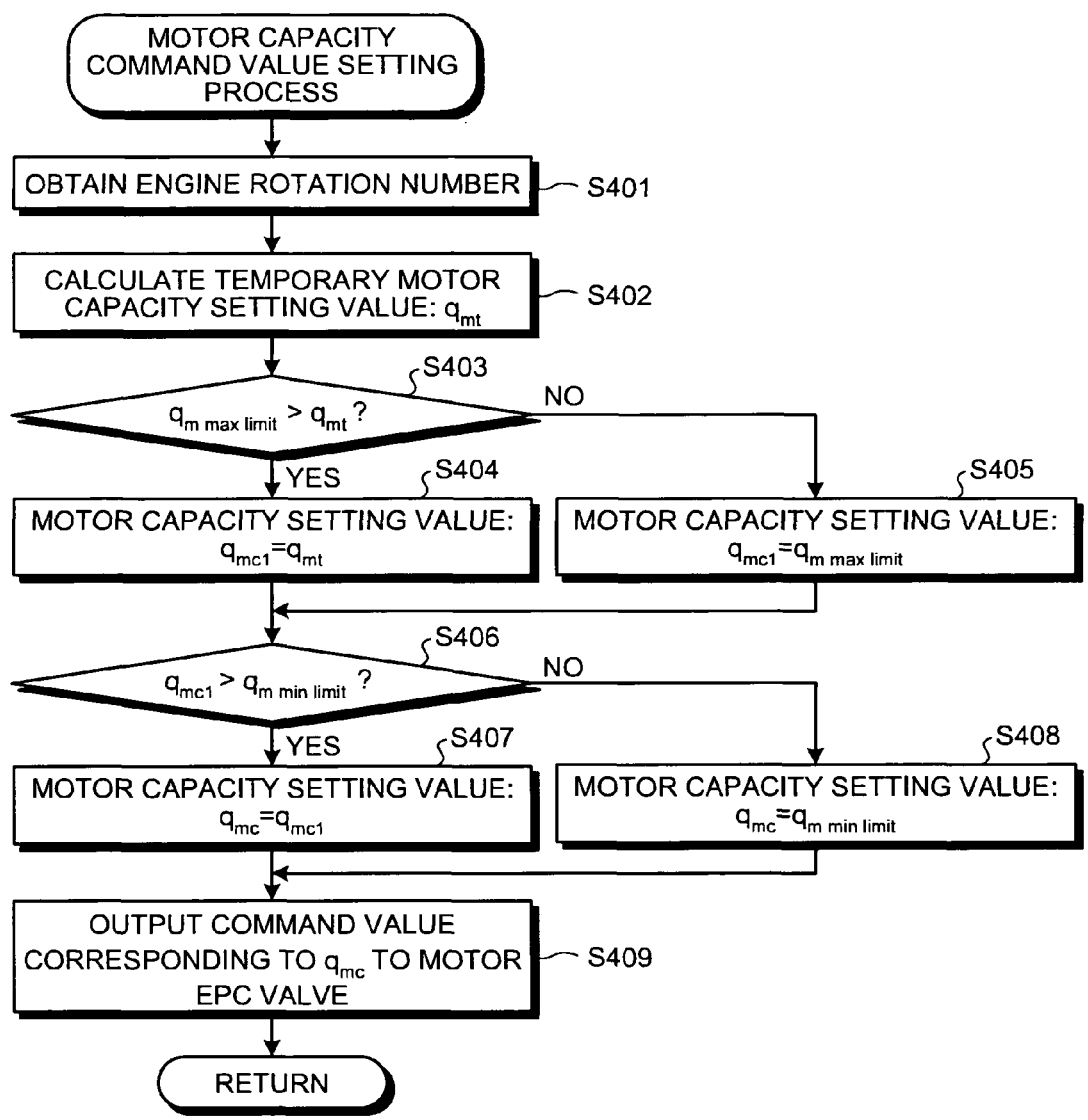
FIG. 11 is a flowchart showing contents of motor capacity command value setting process shown in FIG. 7.

In the motor capacity command value setting process in step S400, the controller 30 obtains the rotation number of the engine 3 through the engine rotation sensor 43 as shown in FIG. 11 (step S401). Next, the controller 30 calculates the capacity of the HST motor 20 as a temporary motor capacity setting value qmt based on the information of the obtained rotation number of the engine 3, the rotation number of the engine—command pressure data in FIG. 4 stored in the memory 34 and the motor capacity—load pressure data in FIG. 6 (step S402).

Next, the controller 30 compares the temporary motor capacity setting value qmt and the maximum capacity limit value qm max limit of the HST motor 20 which is set by the capacity limit setting unit 31 with each other (step S403), and sets the smaller one to the motor capacity setting value qmcl (step S404 and step S405). The motor capacity setting value qmcl and the minimum capacity limit value qm min limit of the HST motor 20 which is set by the capacity limit setting unit 31 are compared with each other (step S406), and sets the greater one to a motor capacity setting value qmc (step S407 and step S408).

Lastly, current required for the motor capacity command value corresponding to the set motor capacity setting value qmc is output to the motor EPC valve 22 (step S409), and then, the procedure is returned. With the above processes, the tilting angle of the HST motor 20 is varied in accordance with the motor capacity command value, and the capacity of the HST motor 20 corresponds to the rotation number of the engine 3.

Thereafter, the pump capacity command value setting process and the motor capacity command value setting process are repeatedly executed for every cycle time, and the hydraulic drive apparatus is operated by the HST pump 10 and the HST motor 20 whose setting of the capacity is changed in accordance with the rotation number of the engine 3.

The pump capacity command value which is set in the pump command pressure setting unit 32 brings the capacity of the HST pump 10 equal to or less than the maximum capacity limit value which is set by the capacity limit setting unit 31, and the motor capacity command value which is set in the motor capacity command value setting unit 33 keeps the capacity of the HST motor 20 within a range between the maximum capacity limit value which is set by the capacity limit setting unit 31 and the minimum capacity limit value.

Therefore, according to the hydraulic drive apparatus which is operated based on the pump capacity command value given from the pump command pressure setting unit 32 and the motor capacity command value given from the motor capacity command value setting unit 33, both the output torque upper limit of the HST motor 20 required by selecting the running mode and the vehicle speed upper limit are satisfied.

As explained above, in the hydraulic drive apparatus, the maximum capacity limit value qm max limit and the minimum capacity limit value qm min limit of the HST motor 20 are set and the maximum capacity limit value qp max limit of the HST pump 10 is set in the capacity limit setting unit 31 of the controller 30. Therefore, the running mode which can be set by the running mode change-over switch 41 and the vehicle speed upper limit which can be set by the vehicle speed setting potentiometer 40 are not limited, and flexible setting suitable for a driver's will can be made. For example, if both the traction force upper limit of the vehicle and the speed upper limit of the vehicle are set small, the hydraulic drive apparatus is operated in accordance with this value, it is possible to reliably prevent slippage even at a narrow worksite with a low friction road surface, to prevent a vehicle from running at high speed carelessly, and to remarkably enhance the operability of a vehicle to be applied.

The above-described operation do not need to adjust the accelerator pedal of the engine 3, and even if the accelerator pedal is depressed to the maximum, it is possible to prevent the vehicle from slipping and the vehicle can move at low speed. Therefore, a discharge amount of pressure oil from the working machine hydraulic pump 6 driven by the engine 3 is not reduced, high operation speed can be secured for the hydraulic working machine 7, and the operation efficiency is not affected.

The maximum capacity limit value qm max limit, the minimum capacity limit value qm min limit of the HST motor 20, and the maximum capacity limit value qp max limit of the HST pump 10 are set by the controller 30 which is the electronic control apparatus. Therefore, the maximum capacity limit value qm max limit, the minimum capacity limit value qm min limit of the HST motor 20, and the maximum capacity limit value qp max limit of the HST pump 10 can be freely set, and they can always be set to optimal values in accordance with the upper limit of the output torque required by the motor 20 and the upper limit of the rotation number.

In order to more precisely define the vehicle speed upper limit (=upper limit of the rotation number of the HST motor 20), it is preferable to correct the maximum capacity limit value qp max limit of the HST pump 10 in addition to the processes of the above-described embodiment. That is, when a vehicle runs on an uphill road or downhill road, a running load is largely increased or reduced as compared with running on a flat road. Therefore, even if the maximum capacity limit value is set in the HST pump 10, if a vehicle runs on a downhill road of large gradient, there is a possibility that the vehicle speed exceeds the upper limit.

In such a case, if the maximum capacity limit value qp max limit of the HST pump 10 is corrected, it is possible to control the speed such that the vehicle speed becomes lower than the speed upper limit. When the maximum capacity limit value qp max limit of the HST pump 10 is to be corrected, the rotation number of the HST motor 20 is specified from detection results of the pressure detection sensors 44 and 45, and the maximum capacity limit value qp max limit of the HST pump 10 is corrected such that it becomes lower than the vehicle speed upper limit. If such control is carried out, it is possible to precisely define the vehicle speed even when the vehicle runs on a downhill road having the large gradient.

The output shaft 20a of the HST motor 20 is provided with a rotation number detection sensor 46 (see FIG. 1), and the maximum capacity limit value qp max limit of the HST pump 10 is corrected such that the vehicle speed converted by the detection result of the rotation number detection sensor 46 becomes lower than the upper limit. With this also, the same effect can be obtained. Instead of providing the rotation number detection sensor 46 on the output shaft 20a, the vehicle may be provided with a speed detection sensor.

In the above-described embodiment, the maximum capacity limit value qm max limit (and the minimum capacity limit value) of the HST motor 20 is first set in the capacity limit setting unit 31 of the controller 30 and then, the maximum capacity limit value qp max limit of the HST pump 10 is set. However, it is not necessary to first set the maximum capacity limit value qm max limit (and minimum capacity limit value qm min limit) of the HST motor 20, the maximum capacity limit value qp max limit of the HST pump 10 may be set first, or both of them can be set at the same time.

For example, the "low traction mode" is selected by the running mode change-over switch 41 and the speed upper limit is set to Vb by the vehicle speed setting potentiometer 40, a maximum capacity limit value qp max limit is set to qpb from the pump-side setting table ("L1"→"L2"→"L3") in FIG. 3 based on the running mode="low traction mode" and the speed upper limit=Vb. Then, the maximum capacity limit value qm max limit (and the minimum capacity limit value qm min limit) of the HST motor 20 can be set to cL·qm max from the motor-side setting table ("l1"→"l2"→"l3") in FIG. 3 based on the running mode="low traction mode" and the speed upper limit=Vb.

Although the hydraulic drive apparatus for running a vehicle is indicated as an example in the above embodiment, the hydraulic drive apparatus is not limited to one for running the vehicle and can be used as a general hydraulic drive apparatus.

An output torque upper limit of the HST motor 20 is set and input by selecting a running mode in the embodiment, the invention is not limited to this, and the upper limit of the output torque may be directly set and input, for example, by the vehicle speed setting potentiometer 40. In this case, the output torque is not limited to three stage setting input, the number of stages may be three or more, and any value may continuously be set and input.

Figure 12:
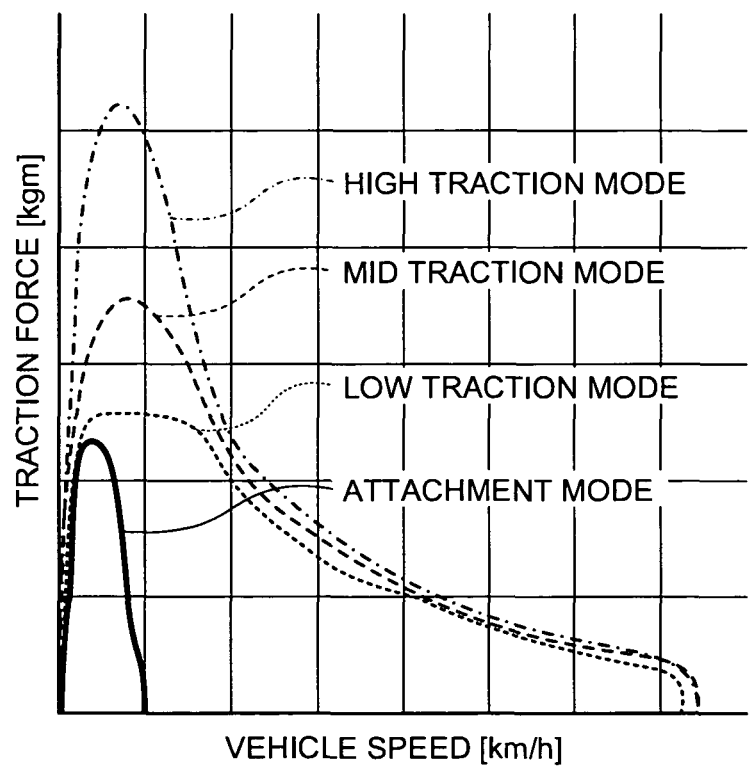
FIG. 12 is a graph showing speed and traction force of a vehicle required for an attachment mode in which a snow blower is attached to the hydraulic drive apparatus shown in FIG. 1.

The upper limit of the traction force (=output torque upper limit of the HST motor 20) is set by the running mode change-over switch 41 and the vehicle speed upper limit (=upper limit of the rotation number of the HST motor 20) is set by the vehicle speed setting potentiometer 40 in the above-described embodiment. In other words, the traction force upper limit and the speed upper limit are separately set. However, the present invention is not limited to this. For example, in the case of a vehicle to which a snow blower is attached as an attachment of a working machine, as shown in attachment mode in FIG. 12, it is necessary to set the traction force upper limit small to always prevent slip on a snow road ("low traction mode", for example), and it is also necessary to set the speed upper limit small so that the vehicle can run together with operation of the snow blower. That is, when a snow blower is attached, it is necessary to always set the traction force and the speed upper limit of the vehicle at the same time. Therefore, if the special switch for setting the attachment mode separately, it is possible to easily operate the vehicle with the snow blower attached in a state where the optimal traction force and vehicle speed are set.

Figure 13:
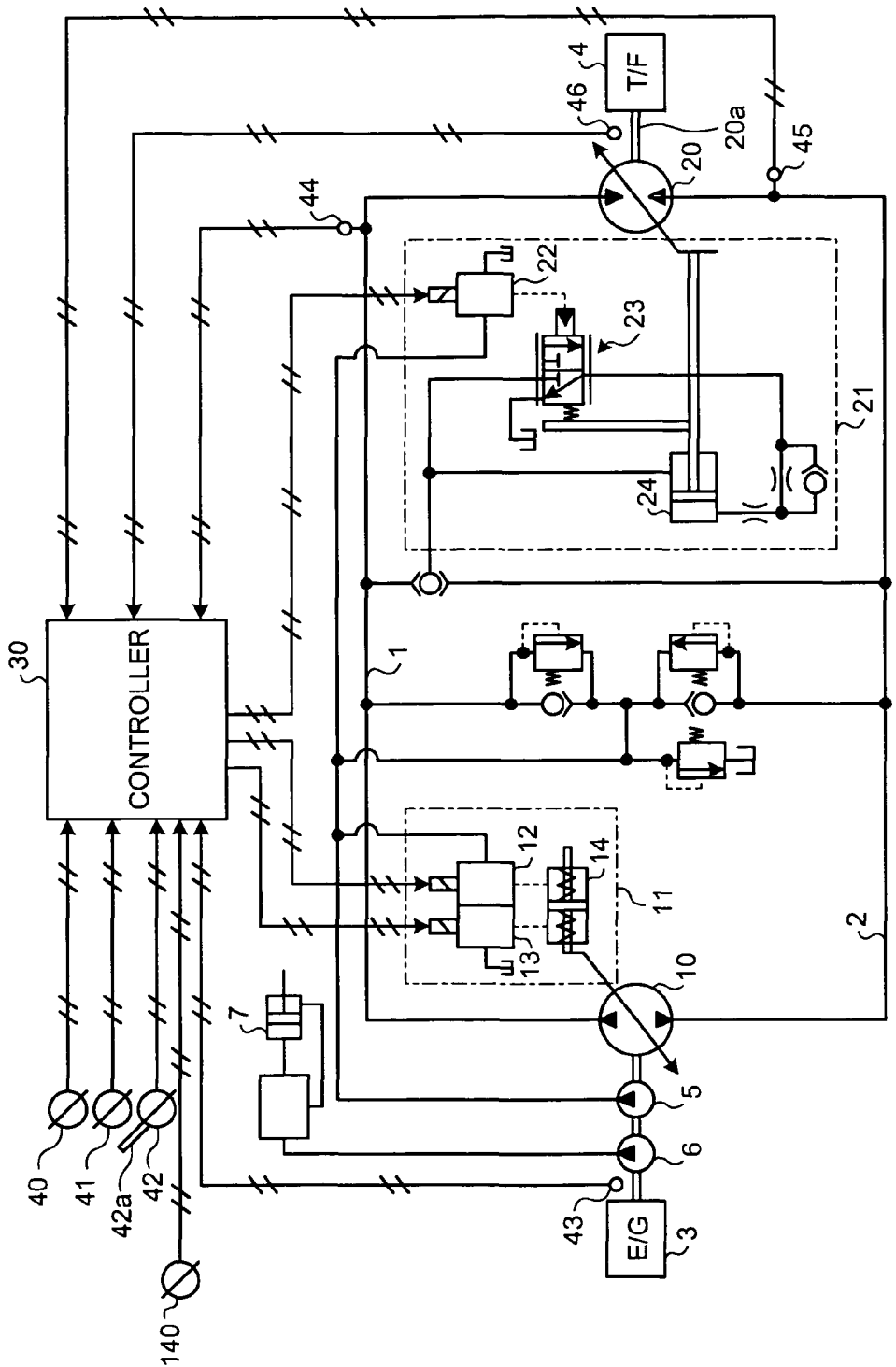
FIG. 13 is a circuit diagram showing a structure of the hydraulic drive apparatus provided with upper limit setting unit for setting the attachment mode shown in FIG. 12.

The hydraulic drive apparatus shown in FIG. 13 for example includes an attachment mode switch (upper limit setting unit) 140 which sets a traction force and a speed upper limit of a vehicle with a single operation at the same time at a location where the attachment mode switch 140 can be operated from a driver's seat in addition to the vehicle speed setting potentiometer 40, the running mode change-over switch 41 and the direction input lever switch 42. According to the hydraulic drive apparatus, when the attachment mode switch 140 is operated, the traction force and the speed upper limit of the vehicle which are currently set by the controller 30 are canceled, and a traction force and a speed upper limit of a vehicle which are required when the snow blower is attached are set simultaneously. Thus, according to the hydraulic drive apparatus, the traction force and the speed upper limit of a vehicle are set to values suitable for the attachment mode without separately operating the vehicle speed setting potentiometer 40 and the running mode change-over switch 41, and the operation of a vehicle is further facilitated.

The invention claimed is:

1. A hydraulic drive apparatus which drives a variable displacement hydraulic motor by a pressure oil discharged from a variable displacement hydraulic pump and outputs a driving force of the hydraulic motor to outside, the hydraulic drive apparatus comprising:
a torque upper limit setting unit which sets an upper limit of an output torque with respect to the hydraulic motor;
a rotation number upper limit setting unit which sets an upper limit of the rotation number with respect to the hydraulic motor; and
a control unit which sets a maximum capacity limit value of the hydraulic motor in accordance with the upper limit of the output torque, sets a minimum capacity limit value of the hydraulic motor in accordance with the upper limit of the rotation number, and sets a maximum capacity limit value of the hydraulic pump in accordance with the upper limit of the output torque and the upper limit of the rotation number, when the upper limit of the output torque is set by the torque upper limit setting unit and when the upper limit of the rotation number is set by the rotation number upper limit setting unit;
(a) when the upper limit of the rotation number with respect to the hydraulic motor set by the rotation number upper limit setting unit exceeds an upper limit of the rotation number which is defined by the maximum capacity limit value of the hydraulic motor, the control unit sets the capacity limit value of the hydraulic motor as the minimum capacity limit value, the capacity limit value corresponding to the upper limit of the rotation number with respect to the hydraulic motor and the upper limit of the rotation number being set by rotation number upper limit setting unit, and
(b) when the upper limit of the rotation number with respect to the hydraulic motor set by the rotation number upper limit setting unit does not exceed the upper limit of the rotation number which is defined by the maximum capacity limit value of the hydraulic motor, the control unit sets the maximum capacity limit value of the hydraulic motor as the minimum capacity limit value of the hydraulic motor, and
wherein, in a case of (b), the capacity limit value of the hydraulic pump is set as the maximum capacity limit value of the hydraulic pump, the capacity limit value corresponding to the upper limit of the rotation number with respect to the hydraulic motor and the upper limit of the rotation number being set by the rotation number upper limit setting unit.

2. The hydraulic drive apparatus according to claim 1, wherein, in a case of (a), the capacity limit value of the hydraulic pump is set as the maximum capacity limit value of the hydraulic pump, the capacity limit value corresponding to an upper limit of the rotation number with respect to the hydraulic motor and the upper limit of the rotation number being set by the rotation number upper limit setting unit.

3. The hydraulic drive apparatus according to claim 1, further comprising:
a motor capacity setting unit which sets and changes the capacity of the hydraulic motor by changing a tilting angle in accordance with a capacity command signal given from the control unit; and
a pump capacity setting unit which sets and changes the capacity of the hydraulic pump by changing the tilting angle in accordance with the capacity command signal given from the control unit, wherein
the control unit gives, to the motor capacity setting unit and the pump capacity setting unit, a capacity command signal to make a capacity of the hydraulic motor and the hydraulic pump equal to or lower than the maximum capacity limit value set for each of the hydraulic motor and the hydraulic pump.

4. The hydraulic drive apparatus according to claim 1, further comprising
a pressure detection sensor which detects a pressure in an oil pressure supply tube through which a pressure oil flows between the hydraulic pump and the hydraulic motor, wherein
the control unit corrects the maximum capacity limit value of the hydraulic pump such that the rotation number of the hydraulic motor specified from a detection result of the pressure detection sensor becomes equal to or less than the upper limit.

5. The hydraulic drive apparatus according to claim 1, further comprising
a rotation number detection sensor which detects the rotation number of the hydraulic motor, wherein
the control unit corrects the maximum capacity limit value of the hydraulic pump such that a detection result of the rotation number detection sensor becomes equal to or less than the upper limit.

6. The hydraulic drive apparatus according to claim 1, further comprising
an upper limit setting unit which simultaneously sets, with a single operation, the upper limit of the output torque and the upper limit of the rotation number with respect to the hydraulic motor.

* * * * *